United States Patent
Cheng et al.

(10) Patent No.: US 11,783,799 B2
(45) Date of Patent: Oct. 10, 2023

(54) DISPLAY ENGINE INITIATED PREFETCH TO SYSTEM CACHE TO TOLERATE MEMORY LONG BLACKOUT

(71) Applicant: ATI Technologies ULC, Markham (CA)

(72) Inventors: Tony Chang-Yi Cheng, Richmond Hill (CA); Oswin Hall, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/362,791

(22) Filed: Jun. 29, 2021

(65) Prior Publication Data
US 2022/0415285 A1     Dec. 29, 2022

(51) Int. Cl.
*G09G 5/395*     (2006.01)
*G09G 5/393*     (2006.01)
*G06F 12/0862*   (2016.01)
*G09G 5/00*      (2006.01)

(52) U.S. Cl.
CPC ......... *G09G 5/395* (2013.01); *G06F 12/0862* (2013.01); *G09G 5/001* (2013.01); *G09G 5/393* (2013.01); *G09G 2360/08* (2013.01); *G09G 2360/121* (2013.01)

(58) Field of Classification Search
CPC ........ G09G 5/395; G09G 5/001; G09G 5/393; G09G 2360/08; G09G 2360/121; G06F 12/0862; G06F 1/3265; G06F 1/3203
See application file for complete search history.

(56) References Cited

U.S. PATENT DOCUMENTS

| | | | |
|---|---|---|---|
| 7,698,579 B2* | 4/2010 | Hendry | G06F 1/3203 713/320 |
| 2006/0187239 A1* | 8/2006 | Clark-Lindh | G09G 5/395 345/659 |
| 2006/0256033 A1* | 11/2006 | Chan | G09G 5/395 345/1.1 |
| 2012/0206461 A1* | 8/2012 | Wyatt | G06F 1/3218 345/501 |
| 2013/0038615 A1* | 2/2013 | Hendry | G09G 5/399 345/502 |
| 2015/0248741 A1* | 9/2015 | Iranli | G06T 1/60 345/557 |
| 2015/0317120 A1* | 11/2015 | Kim | G06F 1/1686 345/1.3 |
| 2021/0132769 A1* | 5/2021 | Parikh | G06F 1/1616 |

* cited by examiner

*Primary Examiner* — Said Broome
*Assistant Examiner* — Donna J. Ricks
(74) *Attorney, Agent, or Firm* — Volpe Koenig

(57) ABSTRACT

A disclosed technique includes prefetching display data into a cache memory, wherein the display data includes data to be displayed on a display during a memory black-out period for a memory; triggering the memory black-out period; and during the black-out period, reading from the cache memory to obtain data to be displayed on the display.

20 Claims, 4 Drawing Sheets

DISPLAY ENGINE INITIATED PREFETCH TO SYSTEM CACHE TO TOLERATE MEMORY LONG BLACKOUT

BACKGROUND

Computing hardware consumes a large amount of power. Mobile devices that rely on batteries to supply this power benefit from power reduction in terms of increased operating duration. Power consumption concerns are thus a perpetual area for improvement for computing hardware.

BRIEF DESCRIPTION OF THE DRAWINGS

A more detailed understanding can be had from the following description, given by way of example in conjunction with the accompanying drawings wherein.

DETAILED DESCRIPTION

A disclosed technique includes prefetching display data into a cache memory, wherein the display data includes data to be displayed on a display during a memory black-out period for a memory; triggering the memory black-out period; and during the black-out period, reading from the cache memory to obtain data to be displayed on the display.

Figure 1:
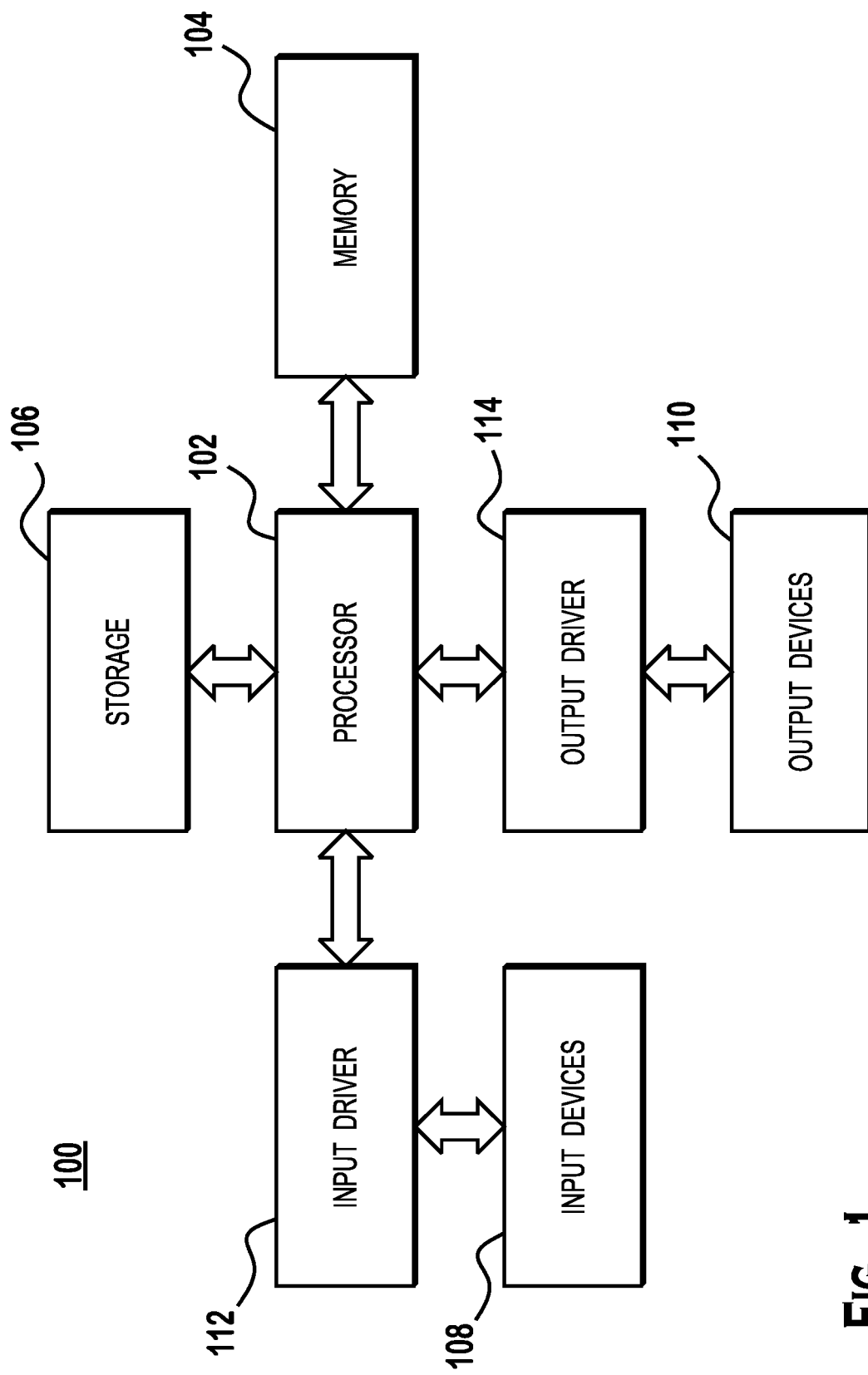
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
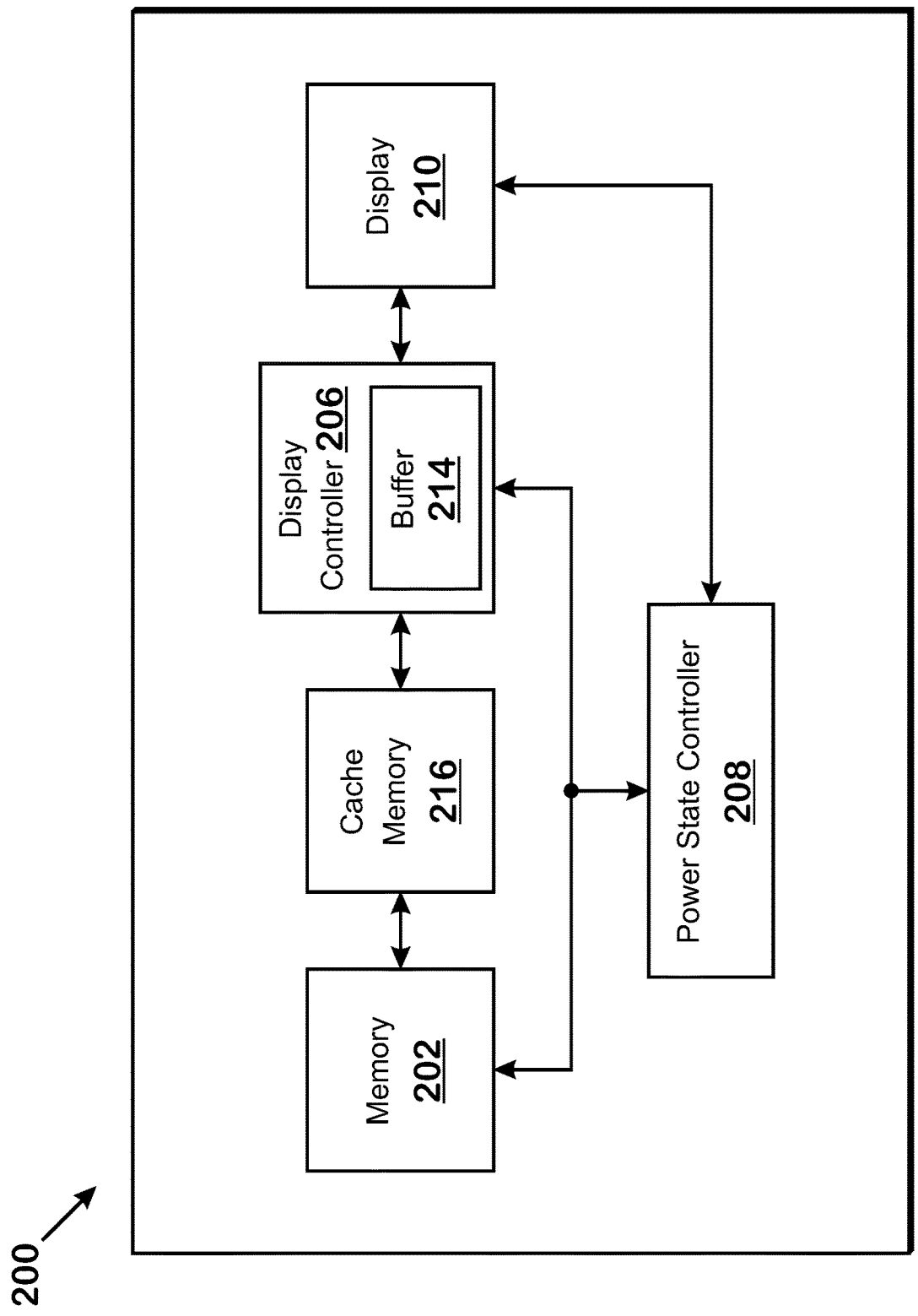
FIG. 2 illustrates a device that is an example implementation of the device of FIG. 1.

FIG. 2 illustrates a device 200 that is an example implementation of the device 100 of FIG. 1. The device 200 includes a memory 202 (which, in some embodiments, is the memory 104 of FIG. 1), a display controller 206, and a power state controller 208.

The memory 202 includes one or more memory devices, such as main memory (e.g., memory 104) or other memories. The display controller 206 is capable of interfacing with the memory 202. Specifically, the display controller 206 fetches display data such as pixel color values and places the data into buffer 214. The display controller 206 reads the data from the buffer 214 and provides that data to the display 210. The display 210 displays the pixel color values provided by the display controller 206, controlling display circuitry to emit specified colors according to the color values. To display images, the display 210 displays a series of frames. The display controller 206 provides sufficient pixel data for individual frames to be displayed. In some modes of operation, the display controller 206 provides pixel information for all pixels of each frame to the display 210, and the display 210 displays the corresponding pixels. In other modes of operation, the display 210 is capable of performing a self-refresh function, in which the display 210 repeats the contents of a frame one or more times, reducing the need for data transfer from the display controller 206 to the display 210.

The power state controller 208 is capable of controlling the power state of one or more portions of the device 200. Different portions of the device 200 are capable of being set to different power states individually. A power state includes a definition of the degree to which a portion of the device 200 is powered on or off. In some examples, a portion of the device 200 has differing capabilities depending on which power state the device 200 is in. In an example, the memory 202 is capable of being powered up or down by varying the clock rate for the memory 202. A higher clock rate results in better performance but a higher power consumption, while a lower clock rate results in worse performance but a lower power consumption. In general, the differing capabilities in differing power states trade capability for power consumption. Specifically, by modifying operations for one or more components of a portion of the device 200, the capabilities associated with that component are modified, but the power that would normally be used by that component is not expended.

The power state controller controls the power states of the different portions of the device 200. In general, the power state controller 208 controls these power states according to inputs from a variety of places, such as hardware units within the device 200 or software modules executing on a processor such as an operating system. In some situations, where the device 200 is sufficiently idle (e.g., no user input has been received recently, and a central processing unit is powered down), the power state controller 208 places the device 200 into a power mode in which the memory 202 has a lowered clock frequency. Where the device 200 is less idle (e.g., where a user provides input or where one or more applications becomes active), the power state controller 208 causes the memory 202 to have a higher clock frequency. The process of changing the clock frequency of the memory 202 places the memory 202 into a state in which the memory 202 is incapable of servicing memory requests such as reads and writes. If the duration of this "black-out state" is high enough such that the buffer 214 drains before being able to be refilled, then the switch in clock frequencies for the memory 202 could result in a display anomaly in which the display 210 is unable to display the correct data. The black-out state is the period of time that it takes to change the operating frequency of the memory 202.

A cache memory 216 exists between the memory 202 and display controller 206. The cache memory 216 caches data read from or written to the memory 202 by the display controller 206 (and, potentially, other entities of the device 200) in response to accesses by the display controller 206, in accordance with typical cache techniques. Techniques are provided herein for prefetching data into the cache to be used by the display controller 206 during the period of time in which the memory 202 is unable to service requests due to changing operating frequencies (the "black out period").

Figure 3:
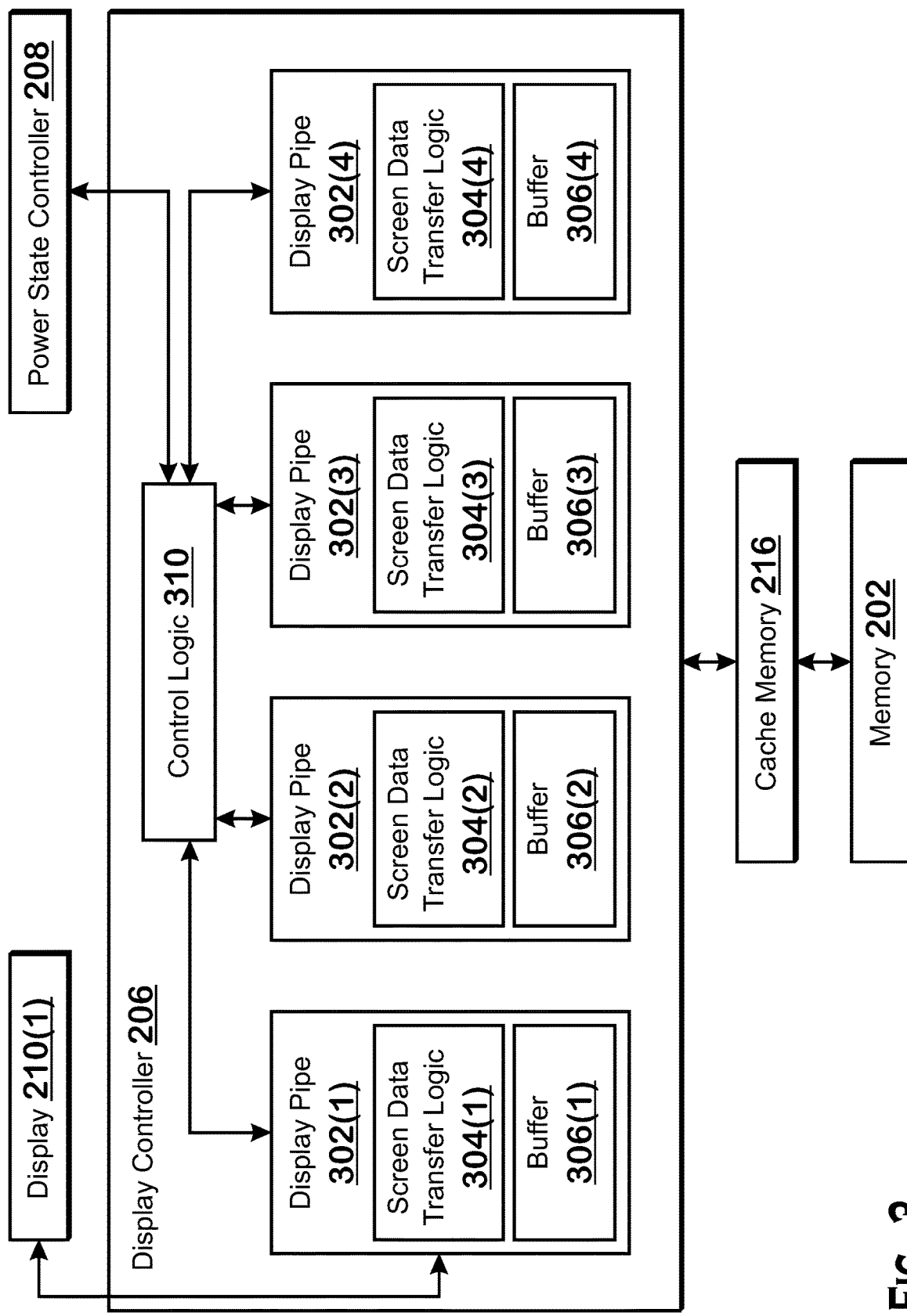
FIG. 3 is a block diagram of the display controller illustrating additional detail.

FIG. 3 is a block diagram of the display controller 206 illustrating additional detail. The display controller 206 includes multiple display pipes 302. The display pipes 302 include, without limitation, screen data transfer logic 304 and a buffer 306. The screen data transfer logic 304 transfers data from the buffer 306 to an associated display 210. The buffer 306 stores pixel data for the screen data transfer logic 304 to transmit to the display 210.

Each display pipe 302 is configured to transmit pixel data to a different display 210 when such a display 210 is connected to the device 200. In one example, an operating system is set up to spread a desktop across four displays 210. Each display pipe 302 provides pixel data for the portion of the desktop appropriate for that display 210. In this mode of operation, the display pipes 302 operate concurrently, each transmitting data to the associated display 210 during the appropriate display period.

The control logic 310 configures the display pipes 302 to fetch data from memory 202 for transmission to one or more displays 210. The control logic 310 configures aspects such as screen resolution, refresh rate, and the memory address range from which to fetch pixel data for any particular pipe 302. The display pipes 302 operate according to the configuration, fetching data for each frame and placing the data in the buffer 306.

In general, to perform prefetching, the control logic 310 configures one or more of the display pipes 302 (one or more "prefetching display pipes") to operate in a prefetch mode. A display pipe 302 operating in a prefetch mode accesses data for another display pipe 302 (referred to as a "primary display pipe"). These accesses cause the data to be prefetched into the cache memory 216 for the primary display pipe. When the memory 202 becomes inactive due to switching clock frequencies, the requests by the primary display pipe 302 to read data are serviced by the cache memory 216 due to the prefetch. Thus, the primary display pipe 302 does not experience display anomalies due to the switch of clock frequencies for the memory 202.

In some implementations, the power state controller 208 notifies the control logic 310 that the power state controller 208 will cause the memory 202 to switch operating frequencies. In response to this notification, the control logic 310 configures one or more prefetching display pipes 302 to prefetch the data that will be needed by a primary display pipe 302 during the black-out period of the memory 202. (Again, the black-out period refers to the time during which the memory 202 will not be able to service requests such as reads or writes). Once the one or more prefetching display pipes 302 has prefetched the data needed during this period the control logic 310 responds to the power state controller 208, indicating that the power state controller 208 is permitted to switch the operating frequencies of the memory 202. The power state controller 208 performs this operation. While the operation to switch operating frequencies is being performed, the primary display pipe 302 accesses the data that was prefetched. Even though the display pipe 302 does not directly request that the cache memory 216 service these requests, the cache memory 216 services these requests, since the cache memory 216 operates as part of a cache hierarchy. The primary display pipe 302 is thus able to retrieve the data needed during the time period in which the operating frequency of the memory 202 is being switched.

In some examples, the control logic 310 predicts the specific data that would be read by the primary display pipe 302 during the black-out period based on timing of operation of the primary display pipe 302. Specifically, when the control logic 310 receives a notification from the power state controller 208 about the impending memory clock frequency switch, the control logic 310 determines the time period during which such switch will occur based on that notification. The control logic 310 determines the location in the frame buffer (the portion of memory from which data is read by the primary display pipe 302) that the primary display pipe 302 is reading from at the notification time. The control logic 310 determines an amount of time it will take for the prefetching display pipe to fetch the required data into the cache memory and for the power state controller 208 to switch the clock frequency of the memory 202. The control logic 310 determines, based on this information, where the primary display pipe 302 will be reading from during the black-out period. Specifically, the control logic 310 identifies the portion of the frame buffer that the primary display pipe 302 will be reading from during the black-out period. The control logic 310 then configures the prefetching display pipe 302 to fetch the data for this portion of the frame buffer. In response, the prefetching display pipe 302 prefetches the data for this portion of the frame buffer into the cache memory 216. Once the prefetched data is available or is soon to be available in the cache memory 216, the control logic 310 instructs the power state controller 208 to modify the clock frequency of the memory 202.

In some implementations, each display pipe 302 is configured as fixed function hardware that fetches data from a frame buffer according to the configuration of the display pipe 302. Specifically, the configuration indicates the resolution (and thus the total amount of data in the frame buffer as well as the number of rows and columns) and the start address of the frame buffer. The display pipe 302 then fetches data from the frame buffer to the buffer 306 of the pipe 302 in order to transmit the data to the display 210. In such examples, the control logic 310 configures the prefetching display pipe 302 to prefetch data into the cache memory 216 by configuring the prefetching display 302 to operate as if the prefetching display pipe 302 were servicing a display with a resolution and refresh rate specified to prefetch the data appropriate for the primary display pipe 302. In other words, the control logic 310 configures the prefetching display pipe 302 to operate as if that prefetching display pipe were servicing a display from a portion of memory that corresponds to the data needed by the primary display pipe 302 during the back-out period. In an example, if the primary display pipe 302 requires 96 lines of data during the black-out period, and each line has 2,048 pixels, and the initial pixel required during the black-out period has a particular address, then the control logic 310 configures the prefetching display pipe 302 to operate as if the prefetching display pipe 302 were servicing a display having a resolution of 2.96, with a frame buffer beginning at the particular address. The prefetching display pipe 302 then then "services" such a display by reading the appropriate data. This read, which is a memory access, causes the data to be prefetched into the cache memory 216. In some examples, once the prefetching display pipe 302 has caused the data for the primary display pipe 302 to be prefetched into the cache memory 216, the control logic 310 causes the prefetching display pipe 302 to stop operating with the particular resolution and frame buffer characteristics.

It is possible for multiple primary display pipes 302 to be operating with one or more prefetching display pipes 302 servicing those multiple primary display pipes 302. In one mode of operation, each primary display pipe 302 is serviced by a different prefetching display pipe 302 concurrently, in a manner described elsewhere herein. In another mode of operation, at least one prefetching display pipe 302 services multiple primary display pipes 302 concurrently in a manner described elsewhere herein. In yet another mode of operation, a single prefetching display pipe 302 services all primary display pipes 302. In instances where one prefetching display pipe 302 services multiple primary display pipes 302, the prefetching display pipe 302 is time-shared between the different primary display pipes 302. In some examples, the control logic 310 controls the prefetching display pipe 302 to be time-shared between the different primary pipes 302 by changing the configuration of the prefetching display pipe 302 in a sequence that causes the prefetching display pipe 302 to perform the time-sharing.

It is possible for each display pipe 302 to be coupled to a display 210. In such situations, in some implementations, there is no display pipe 302 that is available to act as a prefetching display pipe 302. Thus, in such situations, the power state controller 208 does not cause the memory 202 to change operating frequencies, because doing so would result in a black-out period that would result in one or more display pipes 302 having insufficient data for display.

In some implementations, at least one display controller 206 includes no screen data transfer logic 304 and/or no buffer 306. Thus such display controller 206 is unable to service a display 210 coupled to that display controller 206. However, such display controller 206 is still able to act as a prefetching display pipe 302 for other display pipes 302. Thus in some implementations, even where all display pipes 302 that are capable of servicing displays 210 are indeed servicing displayers, there is still a display pipe 302 remaining to perform prefetching operations.

Figure 4:
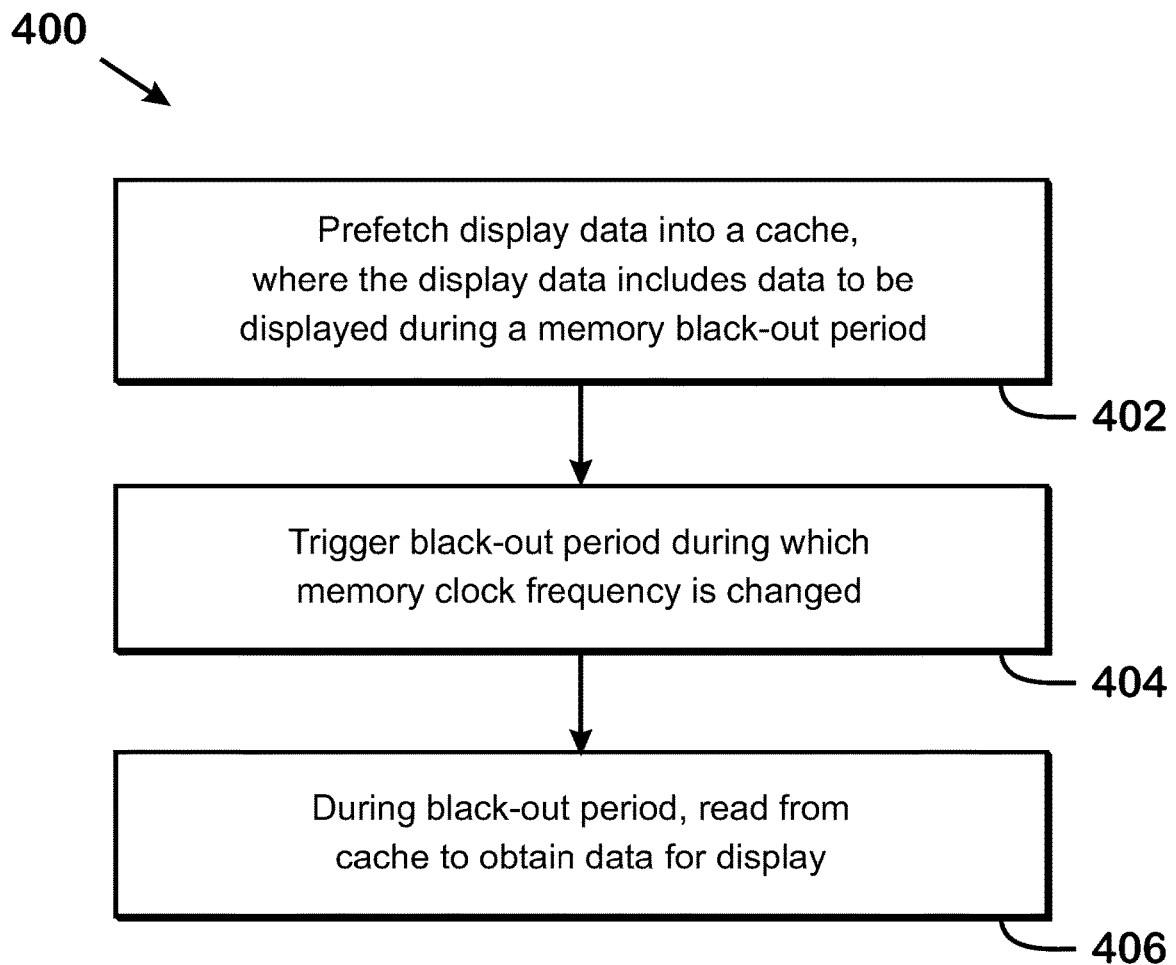
FIG. 4 is a flow diagram of a method for operating a display controller, according to an example.

FIG. 4 is a flow diagram of a method 400 for performing display operations, according to an example. Although the method 400 is described with respect to the system of FIGS. 1-3, those of skill in the art will recognize that any system configured to perform the steps of the method 400 in any technically feasible order falls within the scope of the present disclosure.

At step 402, a prefetching display pipe 302 prefetches display data into a cache memory 216. The display data includes data to be displayed during a memory black-out period. The memory black-out period is a period of time in which a memory 202 is unable to service requests, due to, for example, being in the process of switching clock frequencies.

In some examples, step 402 occurs in response to a control logic 310 controlling a prefetching display pipe 302 to perform the fetching. In some examples, the control logic 310 performs this configuration by configuring the prefetching display pipe 302 to operate as if the prefetching display pipe 302 were reading data for a display having a resolution and frame buffer location that corresponds to the data needed by the primary display pipe 302. In some examples, the control logic 310 performs this configuration in response to the power state controller 208 informing the control logic 310 that a frequency change for the memory 202 is impending.

At step 404, the power state controller 208 triggers a black-out period. In some examples, triggering the black-out period includes performing an operation to change the operating frequency of the memory 202. In some examples, such an operation causes the memory 202 to become unavailable.

At step 406, during the black-out period, the primary display pipe 302 reads from the cache to obtain the prefetched data, in order to display the data on a display 210. In some examples, the primary display pipe 302 operates "normally" during this step. In other words, in some examples, in normal operation, the primary display pipe 302 reads from memory addresses to obtain data for display. If the data is in the cache memory 216, then the read does not require an access to the memory 202. Thus, prefetching the data for the black-out period into the cache memory 216 results in the primary display pipe 302 being able to read data for operation without interruption.

In some examples, after step 406, the control logic 310 causes the prefetching display pipe 302 to stop prefetching into the cache memory 216. In some examples, the prefetching display pipe 302 is time-shared between different primary display pipes 302. Thus in some examples, after step 406, the control logic 310 causes the prefetching display pipe 302 to prefetch data into the cache memory 216 for a different primary display pipe 302. In some examples, the prefetching display pipe 302 has the capability to drive a display 210 directly (e.g., the prefetching display pipe 302 has a buffer 306 and screen data transfer logic 304), while in other examples, the prefetching display pipe 302 does not have such capability (i.e., the prefetching display pipe 302 does not have a buffer 306 or screen data transfer logic 304).

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the display controller 206, the power state controller 208, the additional logic 212, the display pipes 302, and the screen data transfer logic 304) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
   during a non-blackout period, transmitting display data, by a first display pipe, to a first display for display;
   in response to an indication of a memory black-out period occurring for a memory, prefetching display data into a cache memory, wherein the prefetching is performed by a second display pipe that is separate from the first display pipe and the first display pipe and the second display pipe are each capable of transmitting display data to different displays; and
   during the memory black-out period, reading the display data that is prefetched by the second display pipe from the cache memory, by the first display pipe, and transmitting the display data, by the first display pipe, to the first display for display.

2. The method of claim 1, wherein, during the memory black-out period, the memory switches operating frequencies.

3. The method of claim 1, wherein prefetching the display data into the cache memory comprises configuring the second display pipe to read for a display having a resolution and screen buffer starting location that corresponds to the display data to be fetched into the cache memory.

4. The method of claim 1, further comprising ending prefetching the display data in response to an amount of data sufficient for the memory black-out memory period being stored in the cache memory.

5. The method of claim 1, further comprising, after prefetching the display data into the cache memory, causing the memory black-out period to occur.

6. The method of claim 5, wherein causing the memory black-out period to occur comprises notifying a power state controller that frequency change should occur for the memory.

7. The method of claim 1, wherein prefetching the display data into the cache memory comprises prefetching the display data with multiple display pipes.

8. The method of claim 1, wherein prefetching the display data into the cache memory comprises prefetching the display data with a time-shared display pipe.

9. A device, comprising:
   a memory;
   a power state controller configured to trigger a memory black-out period for the memory;
   a cache memory; and
   a display controller comprising:
   a first display pipe, and
   a second display pipe,
   wherein the first display pipe and second display pipe are capable of communicating display data to different displays,
   wherein the second display pipe is configured to:
   in response to an indication of a memory black-out period occurring for the memory, prefetch display data into the cache memory; and
   wherein the first display pipe is configured to:
   during a non-black-out period, transmit display data to the first display for display, and
   during the memory black-out period, read the display data that is prefetched by the second display pipe from the cache memory and transmitting the display data, to the first display for display.

10. The device of claim 9, wherein, during the memory black-out period, the memory switches operating frequencies.

11. The device of claim 9, wherein prefetching the display data into the cache memory comprises configuring the second display pipe to read for a display having a resolution and screen buffer starting location that corresponds to the display data to be fetched into the cache memory.

12. The device of claim 9, wherein the display controller is further configured to end prefetching the display data in response to an amount of data sufficient for the memory black-out period being stored in the cache memory.

13. The device of claim 9, wherein the display controller is further to, after prefetching the display data into the cache memory, cause the memory black-out period to occur.

14. The device of claim 13, wherein causing the memory black-out period to occur comprises notifying the power state controller that frequency change should occur for the memory.

15. The device of claim 9, wherein prefetching the display data into the cache memory comprises prefetching the display data with multiple display pipes.

16. The device of claim 9, wherein prefetching the display data into the cache memory comprises prefetching the display data with a time-shared display pipe.

17. A device, comprising:
   a second display;
   a memory;
   a power state controller configured to trigger a memory black-out period for the memory;
   a cache memory; and
   a display controller comprising:
   a first display pipe, and
   a second display pipe,
   wherein the first display pipe and the second display pipe are capable of communicating display data to different displays,
   wherein the second display pipe is configured to:
   in response to an indication of a memory black-out period occurring for the memory, prefetch display data into the cache memory; and
   wherein the first display pipe is configured to:
   during a non-black-out period, transmit display data to the first display for display, and
   during the memory black-out period, read the display data that is prefetched by the second display pipe from the cache memory and transmitting the display data, to the first display for display.

18. The device of claim 17, wherein, during the memory black-out period, the memory switches operating frequencies.

19. The device of claim 17, wherein prefetching the display data into the cache memory comprises configuring the second display pipe to read for a display having a resolution and screen buffer starting location that corresponds to the display data to be fetched into the cache memory.

20. The device of claim 17, wherein the display controller is further configured to end prefetching the display data in response to an amount of data sufficient for the memory black-out period being stored in the cache memory.

* * * * *